(12) United States Patent
Gilleo

(10) Patent No.: US 6,863,447 B2
(45) Date of Patent: Mar. 8, 2005

(54) PHOTON-CONDUCTING MEDIA ALIGNMENT USING A THERMOKINETIC MATERIAL

(75) Inventor: Kenneth B. Gilleo, Cranston, RI (US)

(73) Assignee: Fry's Metals, Inc., Jersey City, NJ (US)

( * ) Notice: Subject to any disclaimer, the term of this patent is extended or adjusted under 35 U.S.C. 154(b) by 201 days.

(21) Appl. No.: 10/302,145

(22) Filed: Nov. 22, 2002

(65) Prior Publication Data

US 2004/0101252 A1 May 27, 2004

(51) Int. Cl.[7] .................................. G02B 6/36
(52) U.S. Cl. .......................... 385/78; 385/53
(58) Field of Search ............... 385/50, 52, 53, 385/78, 88, 89, 90, 91, 97, 98, 134, 136, 137, 60, 72

(56) References Cited

U.S. PATENT DOCUMENTS 5,142,601 A  *  8/1992  Shibata et al. ............ 385/86
5,881,198 A      3/1999  Haake ...................... 385/136

FOREIGN PATENT DOCUMENTS

JP          60073247 A  *  4/1985  ............ F24J/2/38

OTHER PUBLICATIONS

Feder, "Shape Memory Alloy May Be Ready for Market," New York Times (Jul. 22, 2002).
Hodgson, et al., "Shape Memory Alloys" (visited Feb. 19, 2003) <http://www.sma-inc.com/SMAPaper.html>.
"NiTi Smart Sheet #2: Introduction to Shape Memory and Superelasticity" (visited Jul. 13, 2002) <http://www.sma-inc.com/SMAandSE.html>.
"NiTi Smart Sheet #7: Making Shape Memory Springs" (visited Jul. 13, 2002) <http://www.sma-inc.com/NiTiSprings.html>.
"Nitinol—Shaped Memory Alloy" (visited Jul. 13, 2002) <http://www.imagesco.com/articles/nitinol/>.
"Nitinol" (visited Jul. 13, 2002) <http://www.imagesco.com/catalog/nitinol/nitinol.html>.

* cited by examiner

Primary Examiner—Phan T. H. Palmer
Assistant Examiner—Sarah U Song
(74) Attorney, Agent, or Firm—Mintz, Levin, Cohn, Ferris, Glovsky and Popeo, P.C.

(57) ABSTRACT

Photon-conducting receiving and transmitting media (e.g., optical fibers) are aligned by coupling the receiving medium with a thermokinetic structure, which can include a shape memory alloy. A photon beam is directed from the transmitting medium onto the thermokinetic structure, thereby locally heating the thermokinetic structure. The heated portion of the thermokinetic structure contracts to displace other portions of the structure and the receiving medium, which is coupled therewith, toward the photon beam so as to align the media.

34 Claims, 4 Drawing Sheets

PHOTON-CONDUCTING MEDIA ALIGNMENT USING A THERMOKINETIC MATERIAL

BACKGROUND

Fiber optics represent an expanding field of telecommunications, wherein information is transmitted via light, and non-visible wavelengths such as infrared, through light-permeable "optical" fibers. In the fabrication of fiber-optic networks, optical fibers are routinely joined end-to-end to extend or redirect the path of the information-bearing light signals.

Common single-mode optical fibers, however, typically have a diameter of only about 8 to 9 $\mu$m, which makes the process of end-to-end alignment very slow, laborious, and expensive. Makers of automation equipment have addressed this alignment problem with only modest success. Equipment costing up to $1-million can align a fiber to another fiber or to an optical device, but only after a tedious "rough alignment" has been performed manually. Though, in this context, "rough" alignment, is a misnomer since very-high precision is required to enable some amount of light to be transmitted from one optical fiber to the other. Once light is being transmitted across the optical fibers, the automated equipment can move one of the fibers via an active-alignment process to improve the end-to-end alignment and thereby increase the amount of light transmitted across the fibers.

The rough alignment can be performed for up to several minutes before the fibers are close enough for "first light," where the alignments of the fibers at least overlap so that sufficient light is transmitted across the fibers to begin the active alignment. Once active alignment begins, the robotic equipment may need several more minutes to center the fibers. The fibers can then, finally, be joined.

SUMMARY

The new alignment processes, described below, can enhance the efficiency with which optical elements, such as the optical fibers described above, are aligned. These processes involve the use of a thermokinetic material, such as a shape-memory alloy, to align the optical elements.

In one embodiment, an optical element serving as a transmitting medium is aligned with a second optical element serving as a receiving medium by coupling the receiving medium to a thermokinetic structure formed of the shape-memory alloy. When a photon beam is initially directed through the transmitting medium, it is directed out the end of the transmitting medium and onto the structure of the shape-memory alloy. The photons carry thermal energy that is thereby transferred to the shape-memory alloy in the vicinity of where the photons are directed onto the thermokinetic structure.

As the temperature of the shape memory rises above a transformation temperature, the crystalline phase of the shape-memory alloy changes, thereby causing contraction of that region of the thermokinetic structure. With this contraction, other regions of the thermokinetic structure are drawn toward the area impacted by the photon beam. Because the receiving medium is coupled with the thermokinetic structure, it is likewise drawn closer to the photon beam.

With continued exposure to the photon beam, thermal energy is transferred radially outward across the thermokinetic structure to produce a wave of phase transformations, whereby the contraction of the thermokinetic structure toward the photon beam can continue until the receiving medium is drawn in to the path of the photon beam to obtain first light (i.e., transmission of light from the transmitting medium to the receiving medium). Once first light is obtained, the process can be continued until the transmitting and receiving media are centered; alternatively, existing automated equipment for performing an active alignment can be employed to center the media. After the media are centered, they can then be joined to form a continuous conduit for the photon beam.

These processes offer numerous advantages. For example, they offer a more efficient and direct mode of alignment. Previous methods floundered in face of the great difficult and uncertainty in searching for the receiving fiber when attempting to establish first light as a consequence of searching for a target that occupied only a tiny percentage of the "search" area. In contrast, methods described below effectively detect the absence of the photon beam, whereby the optical elements are drawn together when the photon beam misses the receiving medium due to contraction of the surrounding shape-memory alloy when heated by the photon beam. Further, these methods and the apparatus employed therefor can have a simple, reliable and low-cost design. For example, the shape-memory-alloy structure can be produced at a cost that is orders of magnitude lower than the robotic alignment equipment used in previous methods. Further still, the methods described herein can align optical elements that are far out of alignment, which is something that cannot practically be accomplished with the expensive, automated equipment that is presently in use.

Figure 1:
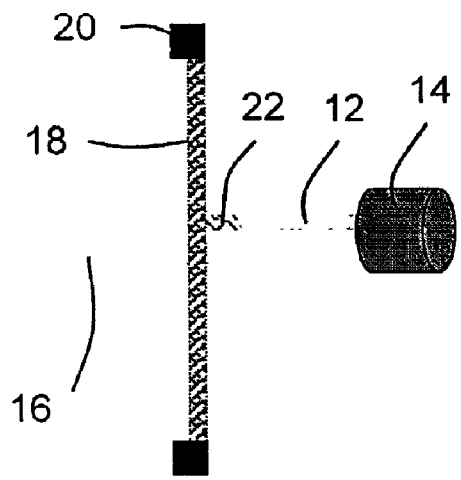
FIG. 1 is an illustration of a transmitting medium coupled with a photon source and a receiving medium coupled to a thermokinetic structure comprising a shape-memory alloy at the initiation of an alignment process.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

An apparatus for aligning photon-conducting media is illustrated in FIG. 1. The apparatus includes a transmitting medium 12 (e.g., a glass or polymer optical fiber) coupled with a photon source 14, such as an infrared or near-infrared laser diode. A receiving medium 16 (e.g., a glass or polymer optical fiber similar to that serving as the transmitting medium) is mounted in a thermokinetic structure 18 comprising a shape-memory alloy. The shape memory alloy can be in the form of a woven fabric and is supported by a rigid frame 20 to maintain its overall shape.

Figure 2:
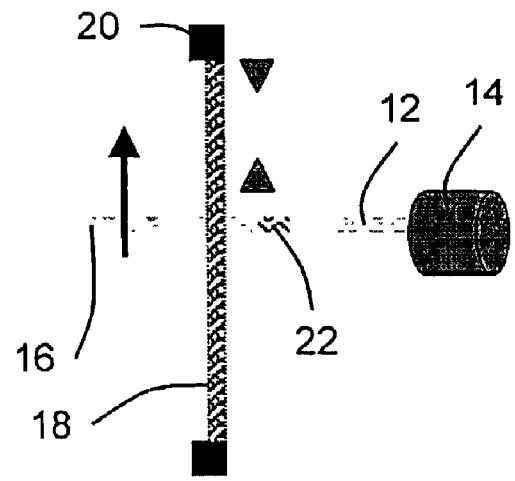
FIG. 2 is an illustration of the apparatus of FIG. 1 after photons from the photon source have been used to heat the shape-memory alloy, thereby causing a transformation of its crystalline phase and a consequent displacement of the thermokinetic structure so as to align the transmission and receiving media.

Methods for using the apparatus to align optical media are described in greater detail, below; however, a brief outline as to the operation of the apparatus of FIGS. 1 and 2 is as follows.

The process begins by directing a photon beam 22 from the photon source 14 through the transmitting medium 12 and onto the thermokinetic structure 18, which is locally heated by the radiation. The locally heated region of the thermokinetic structure 18 contracts (as shown by the arrows), which stretches other areas of the thermokinetic structure 18 and the receiving medium 16 toward the intersection of the photon beam 22 with the thermokinetic structure 18, as shown in FIG. 2. This process can be continued until the media 12 and 16 are aligned.

The shape-memory alloy, from which the thermokinetic structure 18 is preferably formed, is plastically deformable when its temperature is below a transformation temperature, but it reverts to a previously defined (or "remembered") shape when heated above the transformation temperature. In particular embodiments, the shape-memory alloy has a transformation temperature above room temperature so that the remembered shape is only adopted when the alloy is heated.

Below the transformation temperature, the shape memory alloy has a thermoelastic martensitic structure, which lacks long-range order and is deformable via a twinning mechanism. At temperatures above the transformation temperature, the shape memory alloy has an austenitic crystalline structure, which possesses long-range order. The change in shape that accompanies the shift from the martensitic to austenitic phase is known as "the shape-memory effect."

A variety of alloys exhibit the above-described shape memory effect; those that are of greatest interest can recover substantial amounts of strain or generate substantial force upon transformation to the austenitic phase. Representative examples of suitable shape-memory alloys and their transformation temperature and hysteresis during the transformation include the following:

The hystereses of the alloy systems reported in the above table reflect that the phase transformation does not occur at a single temperature, but rather, over a range of temperatures varying with each alloy system.

Figure 3:
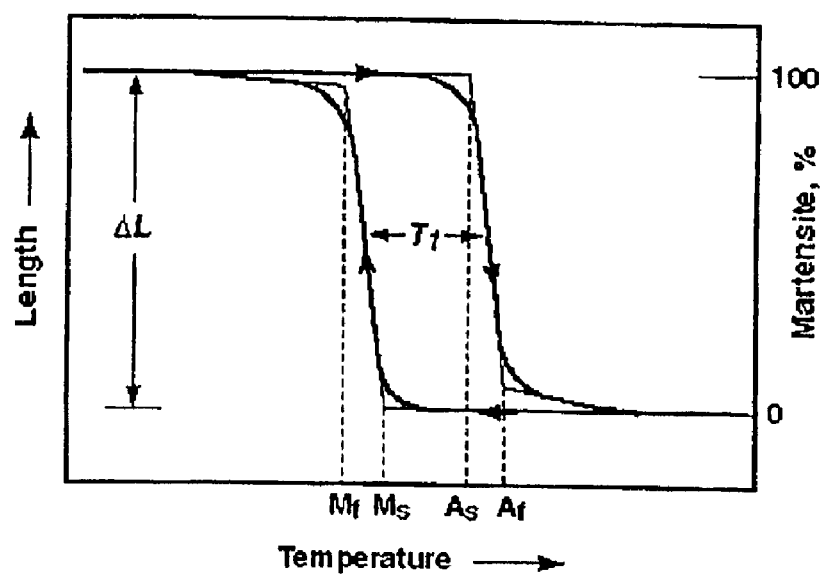
FIG. 3 is a chart illustrating crystalline phase and length of a shape-memory alloy as a function of temperature.

A representative chart illustrating the transformation of a shape-memory alloy under stress as a function of temperature is illustrated in FIG. 3. In the chart, $T_l$ represents the transformation hysteresis; $M_s$ represents the martensite start (upon cooling); $M_f$ represents the martensite finish; $A_s$ represents the austenite start (with heating); and $A_f$ represents the austenite finish. The above-listed alloys and their concentrations are not exclusive. Alloys with a martensitic-austenitic transition temperature between ambient (e.g., about 25° C.) and about 100° C. are particularly suitable for methods described herein.

Nickel-titanium alloys and copper-based alloys, such as copper-zinc-aluminum and copper-aluminum nickel, can be particularly suitable for use in these methods. The Ni—Ti alloys offer a number of advantages over the copper-based alloys. In particular, the Ni—Ti alloys have greater shape memory strain (up to 8%, versus 4 to 5% for the copper-base alloys), tend to be much more thermally stable, have excellent corrosion resistance and susceptibility to stress-corrosion cracking, and have much higher ductility. On the other hand, the copper-based alloys are less expensive, are easily melted and extruded in air, and have a wider range of potential transformation temperatures.

The nickel-titanium system of alloys is based on a binary, equiatomic intermetallic compound of nickel-titanium. This intermetallic compound has a moderate solubility range for excess nickel or titanium, as well as most other metallic elements. Of course, references herein to a nickel-titanium alloy (and other alloy systems) include alloys having relatively small amounts of other elements (including various contaminants) dissolved therein.

The solubility of the nickel-titanium alloys allows for modification of mechanical properties and phase-transformation properties via excess of either element or addition of other elements. In particular embodiments, excess nickel is added in amounts up to about 1%. The excess nickel strongly depresses the transformation temperature and increases the yield strength of the austenite. Other elements that can be dissolved into the alloy include iron and chromium, which lower the transformation temperature, and copper, which decreases the hysteresis and lowers the deformation stress of the martensite.

Major physical properties of the basic binary, equiatomic NiTi alloy with an $A_f$ of about 100° C. and mechanical properties of the alloy in the annealed condition are shown in the following table:

| Alloy | Composition | Transformation Temp. Range (° C.) | Transformation Hysteresis (° C.) |
|---|---|---|---|
| Au—Cd | 46.5–50 atomic-% Cd | 30 to 100 | 15 |
| Cu—Al—Ni | 14–14.5 weight-% Al, 3–4.5 weight-% Ni | −140 to 100 | 35 |
| Cu—Sn | approx. 15 atomic-% Sn | −120 to 30 | |
| Cu—Zn—X (X = Si, Sn or Al) | a few % of X | −180 to 200 | 10 |
| In—Ti | 18–23% atomic-% Ti | 60 to 100 | 4 |
| Ni—Al | 36–38 atomic-% Al | −180 to 100 | 10 |
| Ni—Ti | 49–51 atomic-% Ni | −50 to 110 | 30 |
| Mn—Cu | 5–35 atomic-% Cu | −250 to 180 | 25 |
| Fe—Mn—Si | 32 weight-% Mn, 6 weight-% Si | −200 to 150 | 100 |

| Properties of Binary Ni—TI Shape-Memory Alloys | |
|---|---|
| Melting Temperature, ° C. (° F.) | 1300 (2370) |
| Density, g/cm³ (lb/in.³) | 6.45 (0.233) |
| Resistivity, micro-ohms * cm | |
| Austenite | Approx. 100 |
| Martensite | Approx. 70 |
| Thermal Conductivity, W/cm * ° C. (BTU/ft * hr * ° F.) | |
| Austenite | 18 (10) |
| Martensite | 8.5 (4.9) |
| Corrosion Resistance | Similar to 300 series stainless steel or titanium alloys |
| Young's Modulus, Gpa, (1,000 ksi) | |
| Austenite | Approx. 83 (12) |
| Martensite | Approx. 28 to 41 (4 to 6) |
| Yield Strength, Mpa (ksi) | |
| Austenite | 195 to 690 (28 to 100) |
| Martensite | 70 to 140 (10 to 20) |
| Ultimate Tensile Strength, Mpa (ksi) | 895 (130) |
| Transformation Temperatures, ° C. (° F.) | −200 to 110 (−325 to 230) |
| Latent Heat of Transformation, KJ/kg * atom (cal/g * atom) | 167 (40) |
| Shape Memory Strain | 8.5% maximum |

A shape-memory nickel-titanium alloy, commonly known as Nitinol, was developed by the United States Navy Ordinance Laboratory several decades ago. A major supplier of Nitinol products is Specialty Materials Corp. of New Hartford, N.Y., USA. Nitinol wire of diameter as low as 0.038 mm (0.0015 inches) is available from Dynalloy, Inc. of Cosa Mesa, Calif., USA; and from Nitinol Devices and Components (NDC) of Fremont, Calif., USA.

The desired memory shape can be imparted (or "programmed") to the NiTi alloy via a heat treatment wherein the alloy is heated to a temperature in the range of about 500 to about 800° C. and shaped, as desired. Shaping can also be performed at lower temperatures (e.g., 300 to 350° C.) if sufficient time is allowed. The alloy can be restrained in the desired shape to ensure that it remains there throughout the heat treatment.

Nickel-titanium in the form of a wire, available in diameters as small as about 25 micrometers (about 0.001 inches), can be wound around a mandrel having a diameter in the range, e.g., of about 0.13 mm (about 0.005 inches) to about 0.25 mm (about 0.100 inches) to form a coil. The coiled wire is heated to about 500° to about 800° C. to impart the form of the coil as the memory shape. A preferred design will use the finest wire in the smallest diameter that is practical, to provide the optimum resolution and micro-precision for alignment.

Figure 4:
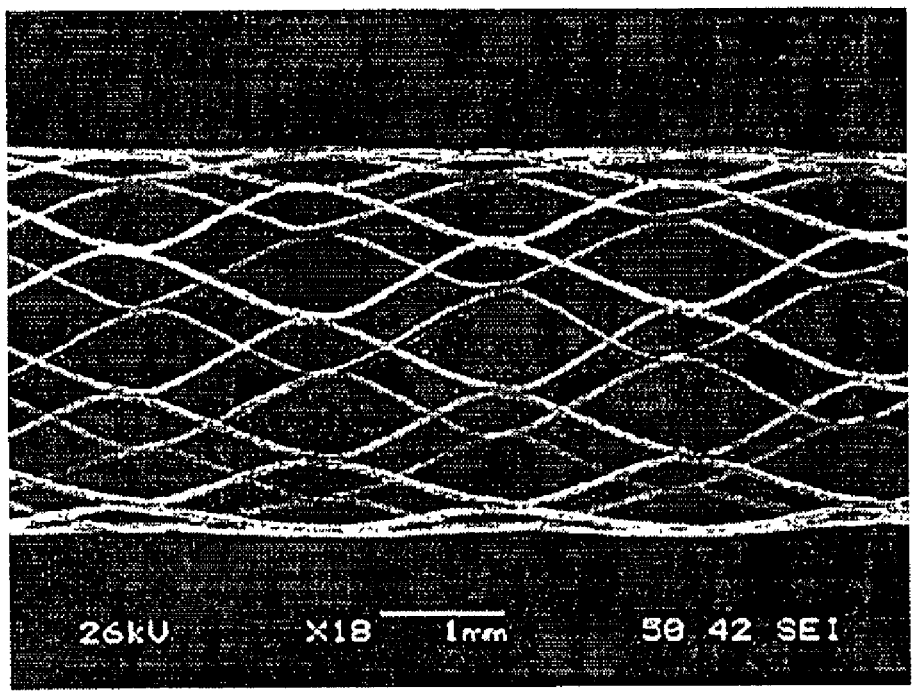
FIGS. 4 and 5 are micrographs of a laser-machined mesh structure suitable as a structure for shape-memory alloys used in the methods described herein.
Figure 5:
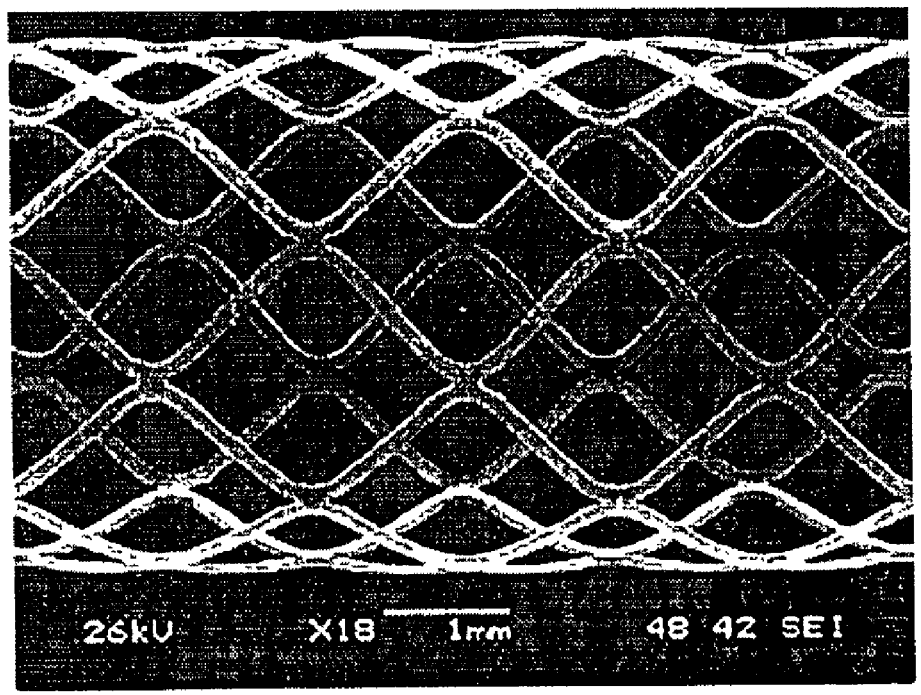
Figure 6:
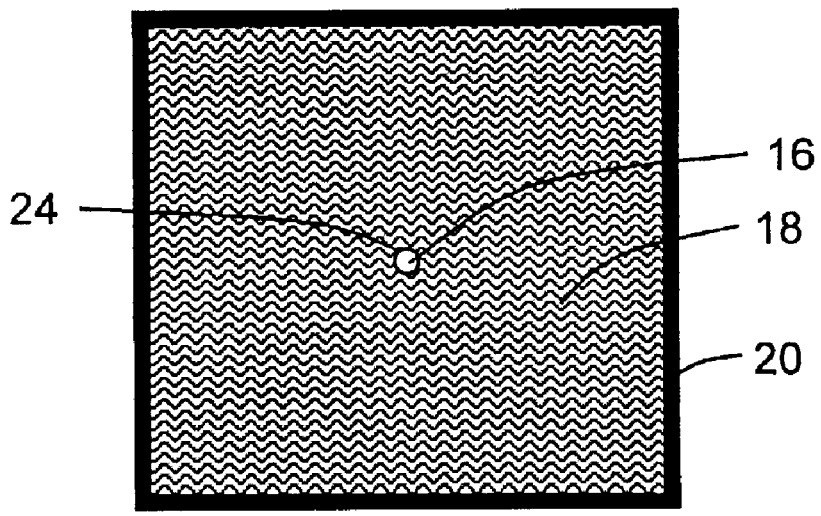
FIG. 6 is an illustration of a woven fabric formed of a shape-memory alloy mounted in a frame and holding a receiving medium near its center.

The shape-memory-alloy wire (whether the wire is substantially straight or in a coil or other form) can be formed into a weave or a mesh. Suitable meshes include machined structures, such as the structures of FIGS. 4 and 5, which are laser-machined with micron-precision. The shape-memory-alloy structure can be porous, though its density should be sufficient to ensure that the photon beam is always in contact with shape-memory alloy during alignment. Within the shape-memory alloy structure 18, a central fiber ferrule 24 (or whatever shape is needed) can be mounted to contain the receiving fiber 12, as shown in FIG 6. At its perimeter, the shape-memory alloy structure 18 is framed by a round or rectangular rigid frame 20. The configuration of the structure 18 can be the same as or similar to a miniature screen and frame used for screen printing, which is familiar to those in the screen-printing industry.

In particular embodiments, the shape-memory alloy is in the form of wire coils (or "micro-springs"), which are woven to form a continuous fabric having a symmetric or near-symmetric contraction memory. The coils can be woven in the same manner as stainless-steel screen-print mesh and, like screen-print mesh, can be woven as fine as 600 coils per inch or finer. The coils can be easily stretched or extended in their martensitic form at room temperature in forming the woven fabric. When the transmitting medium (e.g., an optical fiber) directs a photon beam (e.g., infrared or near-infrared radiation) from the source onto the fabric, the shape-memory alloy can be heated above its transition temperature, causing the shape-memory alloy to retract to its tightly coiled, remembered shape. The selected wavelength of the radiation is one that can pass through the transmitting medium and also transmit heat to the shape-memory alloy. At least initially, only a portion of the structure will be heated above the transition temperature, and other regions—still in a martensitic phase—will be further stretched to accommodate the contraction of the heated portion.

In particular embodiments, the shape-memory alloy is coated with a black oxide to enhance absorption of radiation in the range of wavelengths emitted by the source. The black oxide can be formed by oxidizing nickel at the surface of the nickel-titanium alloy.

Figure 7:
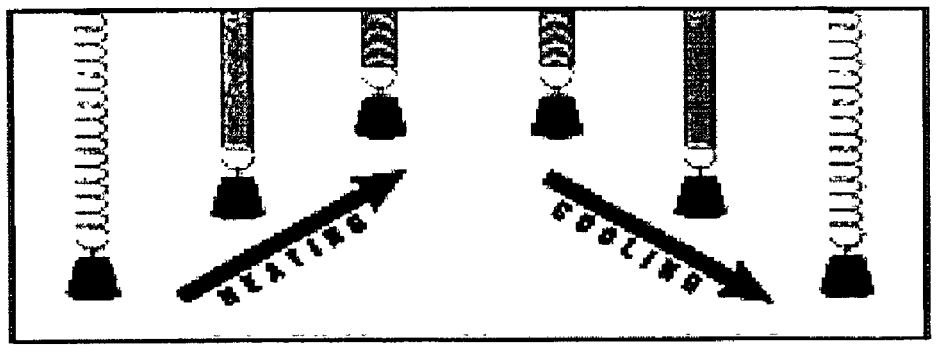
FIG. 7 schematically illustrates the reversible contraction of a coiled shape-memory alloy under tension as it passes above and below its transition temperature.
Figure 8:
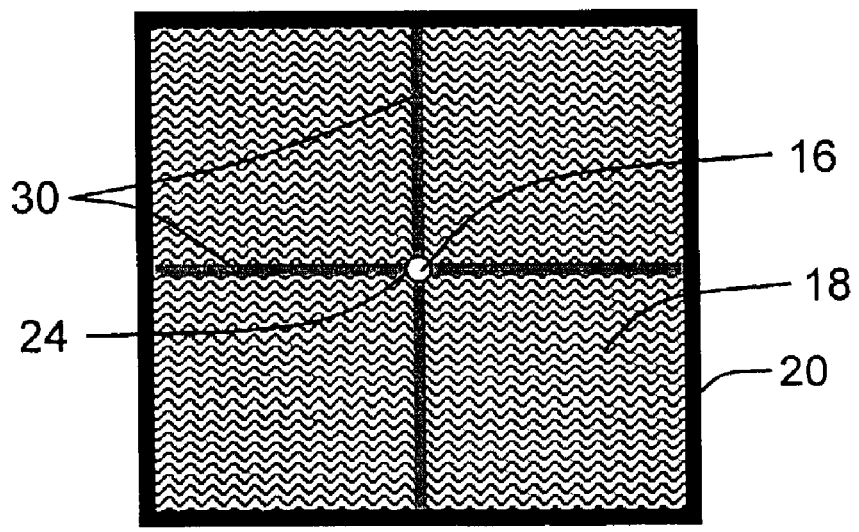
FIG. 8 is an apparatus similar to that of FIG. 6; the apparatus of FIG. 8 further includes springs that provide added tension and/or resilience complementing that of the shape-memory alloy in the woven fabric.

For purposes of illustrating the shape memory effect, contraction of a coil formed of a shape-memory alloy upon heating and under an elongating, tensile force is illustrated in FIG. 7. Straight wire will typically exhibit the least contraction, whereas the shape of a coil can be varied to give any of a range of contraction values. To provide rapid return to equilibrium after heating a wire mesh, some of the wires in the mesh (e.g., every tenth wire) can be a strand of conventional spring rather than a shape-memory alloy. In another embodiment (illustrated in FIG. 8), conventional springs 30 can be attached to edges of the mesh 18 and to the ferrule 24 to improve the rate of return to positional equilibrium after heating. Shapes other than a coil can likewise be used to similar effect to produce more or less contraction upon heating, depending on the remembered shape.

Unless the optical elements are precisely aligned initially, which is highly unlikely if the elements are fibers or other fine media, the photon beam 22 generated by the photon source 14 (e.g., a laser diode) and transmitted through the transmitting medium 12 will be directed onto the shape-memory alloy in the structure 18 surrounding the receiving medium 16 (see FIG. 1). Localized heating of the shape-memory alloy in the vicinity of the photon beam 22 causes the shape-memory alloy to contract as it is converted to its austenitic, remembered shape (e.g., a coil). And the power of the photon beam 22 generated by the photon source 14 can be adjusted to control the rate at which the shape-memory alloy is heated.

The portion of the shape-memory alloy that is in the lower-temperature martensitic phase is easily stretched by the region of the shape-memory alloy that has been converted to a contracted, austenitic phase. Consequently, the lower-temperature regions of the structure 18 and the receiving medium 16, which is coupled with the structure 18, will be drawn toward the photon beam 22 due to the localized contraction of the structure 18 in the vicinity of the beam 22. As thermal energy is conducted through the structure 18 away from the immediate site of contact with the photon beam 22, more of the shape-memory alloy will revert to the austenitic phase, thereby contracting to draw the receiving medium 16 closer and closer to the photon beam 22 until first light is achieved.

In some cases, the process can be continued until the transmission and receiving media 12 and 16 are centered relative to one another. In other cases, robotic equipment can be used to complete the alignment and centering of the media after first light is achieved.

Figure 9:
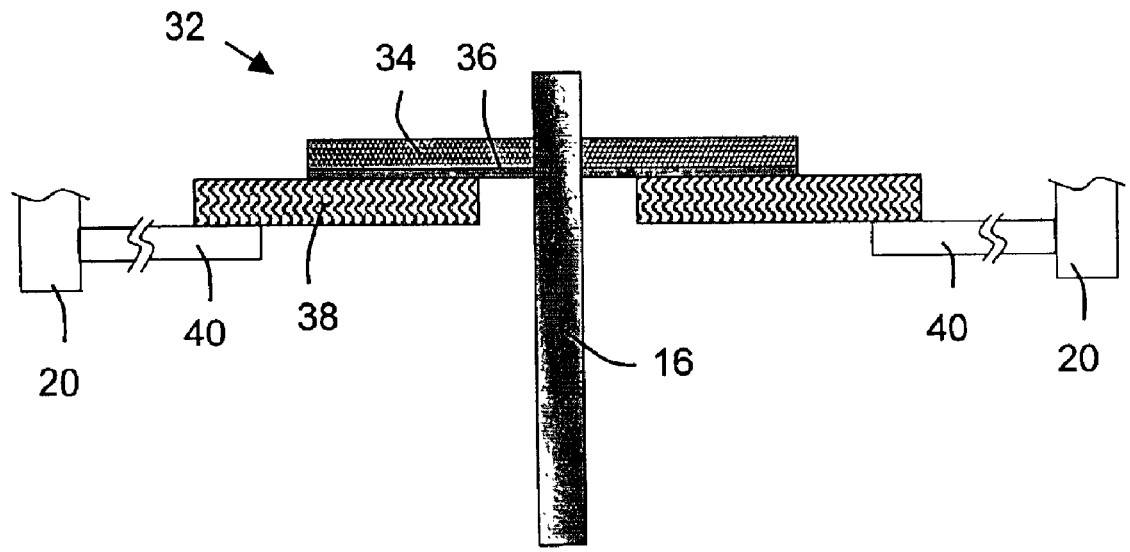
FIG. 9 is cross-sectional view of a locking mechanism coupled with an optical fiber.
Figure 10:
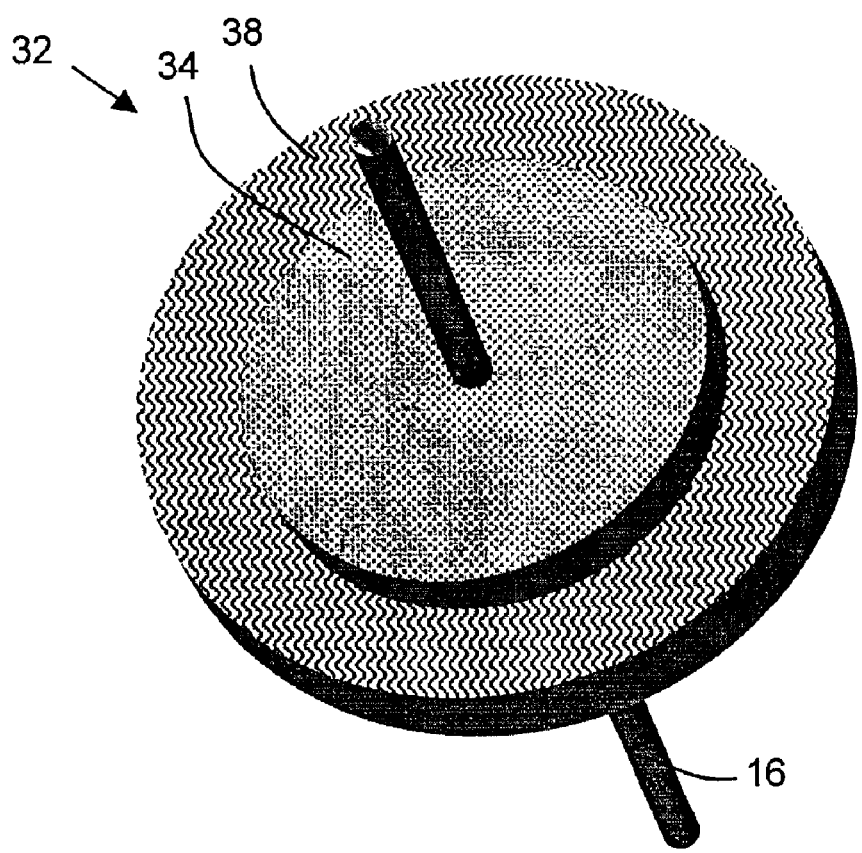
FIG. 10 is a perspective view looking down on the locking mechanism of FIG. 9.

After the media 12 and 16 are centered, the media 12 and 16 are joined. A mechanical locking mechanism 32 (see FIGS. 9 and 10) can be used to fix the relative position of the receiving medium 16 after the media are centered. Absent the locking mechanism 32, the receiving medium 16 may not remain centered with the transmitting medium when the photon beam is not in contact with the shape-memory alloy to maintain an equilibrium in terms of the amount of shape-memory alloy in the austenitic phase and the consequent amount of localized contraction needed to displace other regions of the thermokinetic structure so as to properly align the receiving medium 16 with the transmitting medium. The locking mechanism is mounted on a side of the structure 18 opposite the photon source 14 and transmitting medium 12 (see FIGS. 1 and 2, where the locking mechanism would be rotated 90° clockwise and mounted to the left of the structure 18).

The locking mechanism 32 includes a lightweight disc 34 that can be made of plastic. The disc 34 is coupled with the receiving medium 16 and moves with the receiving medium 16 in a plane perpendicular to the axis of the medium 16. The disc 34 is coated on either side with a thin magnetic film 36. The magnetic film 36 can be formed of magnetic nickel and can be plated, vacuum-deposited or printed as paste made from nickel powder. A magnetic coil 38 is suspended from the frame 20 via support structures 40 and is in close proximity with the thermokinetic structure. When an electric current is applied to the coil 38, the coil 38 is magnetically activated; and the disc 34 is magnetically bonded to the activated coil 38 via the magnetic film 36, thereby fixing the position of the receiving medium relative to the frame. The coil can then be deactivated to free the receiving medium 16 for subsequent repositioning by turning off the electric current applied to the coil 38.

In one embodiment, the axis of the receiving medium 16 is oriented vertically such that the weight of the disc, which may be resting on the magnetic coil 38, pulls downward, if it pulls on the medium 16 at all, so as not to interfere with the positioning of the medium 16 by the thermokinetic structure. The apparatus of FIGS. 1 and 2, which do not illustrate the locking mechanism, can be rotated 90° counterclockwise to achieve a similar alignment.

However, the shape-memory alloy will experience a lag time before it re-establishes a thermal equilibrium, and also experiences a hysteresis that forestalls phase transformation. Consequently, a lag time may be provided for joining the transmission and receiving media 12 and 16 before they pull apart due to cooling of the shape-memory alloy. Additionally, the composition of the shape-memory alloy can be engineered to provide a transition temperature that is only slightly above ambient temperature to further forestall reversion of the shape-memory alloy to the martensitic phase and to further enable joining of the centered media 12 and 16 before they separate.

With or without a fixing mechanism, the media 12 and 16 can be joined using an adhesive or via fusion with a high-voltage spark. Manual and automated fiber fusion equipment is widely available. Newport Corporation (Newport, Calif.) offers one of the most extensive lines of fiber aligners that can fuse optical fiber. The equipment cleans the surfaces of fiber to be mated, and then provides a more energetic electrical arc that melts the glass and causes it to fuse together. While other fusion methods, such as laser heating have been demonstrated, electrical spark discharge is the most common. Suitable fiber alignment/fusion equipment is also available from the following companies: Adept Technology of San Jose, Calif.; Burleigh Industries of Fishers, N.Y.; JDS-Uniphase Corp. of San Jose, Calif.; and New Focus, Inc. of Santa Clara, Calif.

While this invention has been shown and described with references to particular embodiments thereof, those skilled in the art will understand that various changes in form and details may be made therein without departing from the scope of the invention, which is limited only by the following claims. For example, while the embodiments, described above, are generally directed to shape memory alloys, other types of materials that exhibit substantial contraction due to the heat of the photon beam can likewise be used in accordance with the methods and apparatus described above.

What is claimed is:

1. A method for aligning photon-conducting media, the method comprising:
    providing a transmitting medium, a receiving medium, and a thermokinetic structure comprising a thermokinetic material;
    coupling the receiving medium with the thermokinetic structure; and
    directing a photon beam through the transmitting medium onto the structure, the photon beam heating the thermokinetic material within a portion of the thermokinetic structure to contract that portion of the thermokinetic structure to displace other portions of the thermokinetic structure and the receiving medium toward the photon beam.

2. The method of claim 1, wherein the thermokinetic material is a shape-memory alloy and the heating of the shape-memory alloy triggers a phase transformation of the shape memory alloy.

3. The method of claim 2, wherein the photon beam is directed onto the structure to displace the receiving medium toward the photon beam until the receiving medium is aligned with the transmitting medium to receive at least a portion of the photon beam such that at least some of the photons from the transmitting medium are further transmitted through the receiving medium.

4. The method of claim 3, further comprising:
    further aligning the transmitting medium and the receiving medium until substantially all of the photons transmitted from the transmitting medium are received by the receiving medium; and then
    joining the aligned media.

5. The method of claim 4, wherein the further alignment of the media is a consequence of the displacement generated by the phase transformation of the shape-memory alloy.

6. The method of claim 4, wherein the further alignment of the media is performed using additional automated equipment.

7. The method of claim 3, wherein the shape-memory alloy has a martensitic crystalline structure before the phase transformation.

8. The method of claim 7, wherein the shape-memory alloy has an austenitic crystalline structure after the phase transformation.

9. The method of claim 3, wherein the shape-memory alloy comprises at least one alloy selected from the group of silver-cadmium; gold-cadmium; copper-aluminum-nickel; copper-tin; copper-zinc; copper-zinc-X, wherein X is silicon, tin or aluminum; indium-titanium; nickel-aluminum; nickel-titanium, iron-platinum; manganese-copper; and iron-manganese-silicon.

10. The method of claim 9, wherein the shape-memory alloy comprises a nickel-titanium alloy.

11. The method of claim 10, wherein the shape-memory alloy consists essentially of a nickel-titanium alloy.

12. The method of claim 3, wherein the shape-memory alloy forms a coil after the phase transformation.

13. The method of claim 12, wherein the thermokinetic structure is in the form of a fabric.

14. The method of claim 13, wherein the fabric is in the form of a weave.

15. The method of claim 3, wherein the shape-memory alloy is coated with a material that improves its absorption of radiation having infra-red and near-infra-red wavelengths.

16. A method for aligning optical fibers, the method comprising:

coupling a receiving optical fiber with interconnected strands of a shape-memory alloy;

directing a photon beam through a transmitting optical fiber onto the strands of the shape-memory alloy;

heating strands of the shape-memory alloy with the photon beam until the strands undergo a phase transformation to a martensitic crystalline structure;

allowing the receiving optical fiber to be displaced toward the photon beam while the shape-memory alloy is transformed from a martensitic to an austenitic crystalline structure, the strands contracting with the transformation until the receiving optical fiber is positioned to receive photons transmitted from the transmitting optical fiber; and then joining the receiving optical fiber and the transmitting optical fiber, enabling uninterrupted transmission of photons from the transmitting optical fiber through the receiving optical fiber.

17. The method of claim 16, wherein the transmitting optical fiber and the receiving optical fiber are aligned such that substantially all of the photons transmitted from the transmitting optical fiber are received by the receiving optical fiber before the fibers are joined.

18. The method of claim 17, wherein the alignment of the optical fibers is a consequence of the displacement generated by the phase transformation of the shape-memory alloy.

19. The method of claim 16, wherein the position of the receiving optical fiber is fixed by a locking mechanism before the fibers are joined.

20. The method of claim 19, wherein the locking mechanism comprises an activatable magnetic coil and a disc comprising a magnetic material, the disc being coupled with the receiving optical fiber and bending to the magnetic coil when the magnetic coil is activated.

21. The method of claim 16, wherein the shape-memory alloy comprises at least one alloy selected from the group of silver-cadmium; gold-cadmium; copper-aluminum-nickel; copper-tin; copper-zinc; copper-zinc-X, wherein X is silicon, tin or aluminum; indium-titanium; nickel-aluminum; nickel-titanium, iron-platinum; manganese-copper; and iron-manganese-silicon.

22. The method of claim 21, wherein the shape-memory alloy comprises a nickel-titanitun alloy.

23. The method of claim 16, wherein the strands of shape-memory alloy are in the form of coils when in the austenitic crystalline phase.

24. The method of claim 23, wherein the strands are interconnected in the form of a fabric.

25. The method of claim 24, wherein the strands are coated with a material that improves their absorption of the photons.

26. A tool for aligning optical media comprising:

coiled wire formed of a shape-memory alloy, wherein the wire forms an interconnected structure;

a ferrule coupled with the interconnected structure, the ferrule configured to hold an optical fiber within the interconnected structure; and a frame to which the interconnected structure is mounted, wherein coiled wire in the interconnected structure joins the ferrule with the frame.

27. The tool of the claim 26, wherein the shape-memory alloy comprises at least one alloy selected from the group of silver-cadmium; gold-cadmium; copper-aluminum-nickel; copper-tin; copper-zinc; copper-zinc-X, wherein X is silicon, tin or aluminum; indium-titanium; nickel-aluminum; nickel-titanium, iron-platinum; manganese-copper; and iron-manganese-silicon.

28. The tool of claim 27, wherein the shape-memory alloy comprises a nickel-titanium alloy.

29. The tool of claim 28, wherein the shape-memory alloy consists essentially of a nickel-titanium alloy.

30. The tool of claim 26, wherein the shape-memory alloy is coated with a material that improves its absorption of radiation having infra-red and near-infra-red wavelengths.

31. A tool for aligning optical media comprising:

coiled wire formed of a shape-memory alloy, wherein the wire forms an interconnected structure;

a ferrule coupled with the interconnected structure, the ferrule configured to hold an optical fiber within the interconnected structure;

a frame to which the interconnected structure is mounted;

a locking mechanism including a disc comprising a magnetic material; and an activatable magnetic coil mounted to the frame, wherein the coil and disc are designed to bond to one another when the coil is activated.

32. The tool of claim 31, further comprising an optical fiber mounted in the ferrule.

33. A tool for aligning optical media comprising:

coiled wire formed of a shape-memory alloy, wherein the wire is in the form of a fabric; and a ferrule coupled with the fabric, the ferrule configured to hold an optical fiber within the fabric.

34. The tool of claim 33, wherein the fabric is in the form of a weave.

* * * * *